(12) United States Patent
Tholiya et al.

(10) Patent No.: US 10,366,092 B2
(45) Date of Patent: Jul. 30, 2019

(54) SEARCH RELEVANCE

(71) Applicant: WAL-MART STORES, INC., Bentonville, AR (US)

(72) Inventors: Namrata Pramodkumar Tholiya, Sunnyvale, CA (US); Abhishek Gattani, Sunnyvale, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 15/260,130

(22) Filed: Sep. 8, 2016

(65) Prior Publication Data
US 2016/0378771 A1 Dec. 29, 2016

Related U.S. Application Data

(63) Continuation of application No. 14/194,330, filed on Feb. 28, 2014, now Pat. No. 9,524,319, which is a continuation-in-part of application No. 14/186,717, filed on Feb. 21, 2014, now abandoned, which is a continuation-in-part of application No. 13/874,023, filed on Apr. 30, 2013, now abandoned.

(51) Int. Cl.
*G06F 16/28* (2019.01)
*G06Q 30/02* (2012.01)
*G06F 16/332* (2019.01)
*G06F 16/338* (2019.01)
*G06F 16/951* (2019.01)
*G06F 16/2457* (2019.01)

(52) U.S. Cl.
CPC ...... *G06F 16/24578* (2019.01); *G06F 16/285* (2019.01); *G06F 16/338* (2019.01); *G06F 16/3326* (2019.01); *G06F 16/951* (2019.01); *G06Q 30/0201* (2013.01)

(58) Field of Classification Search
CPC ............ G06F 17/3053; G06F 17/30598; G06F 17/30648; G06F 17/30696; G06F 17/30864; G06F 16/24578; G06F 16/285; G06F 16/3326; G06F 16/338; G06F 16/951; G06Q 30/0201
USPC ........................................................ 707/731
See application file for complete search history.

(56) References Cited

U.S. PATENT DOCUMENTS

| | | |
|---|---|---|
| 6,489,968 B1 | 12/2002 | Ortega |
| 6,785,671 B1 * | 8/2004 | Bailey ............... G06F 17/30864 705/26.81 |
| 6,850,988 B1 | 2/2005 | Reed |
| 7,050,992 B1 | 5/2006 | Bowman |
| 7,346,629 B2 | 3/2008 | Kapur |

(Continued)

*Primary Examiner* — Hosain T Alam
(74) *Attorney, Agent, or Firm* — Bryan Cave Leighton Paisner LLP

(57) ABSTRACT

The present invention extends to methods, systems, and computer program products for training a classification model to predict categories. In one implementation, a method identifies category mappings generated for dominant queries associated with a query log. The method identifies mappings between a first set of queries and categories shown for the first set of queries, and identifies mappings between a second set of queries and clicked products for the second set of queries. A classification model is trained based on the mappings generated for dominant queries, the mappings between queries and the shown categories, and the mappings between queries and the clicked products.

20 Claims, 9 Drawing Sheets

(56) References Cited

U.S. PATENT DOCUMENTS

| | | |
|---|---|---|
| 8,065,301 B2 | 11/2011 | Ginsburg |
| 8,195,637 B1 | 6/2012 | Datar |
| 8,234,147 B2 | 7/2012 | Olejniczak |
| 8,239,370 B2 | 8/2012 | Wong |
| 8,548,981 B1 | 10/2013 | Bhattacharjee et al. |
| 8,972,391 B1 | 3/2015 | McDonnell et al. |
| 9,069,843 B2 | 6/2015 | Chitiveli et al. |
| 2003/0195877 A1 | 10/2003 | Ford |
| 2005/0222987 A1 | 10/2005 | Vadon |
| 2006/0122979 A1 | 6/2006 | Kapur |
| 2006/0155694 A1 | 7/2006 | Chowdhury |
| 2006/0242147 A1 | 10/2006 | Gehrking |
| 2007/0061301 A1 | 3/2007 | Ramer et al. |
| 2007/0061363 A1 | 3/2007 | Ramer et al. |
| 2007/0266002 A1 | 11/2007 | Chowdhury |
| 2008/0016049 A1 | 1/2008 | Dettinger |
| 2009/0006363 A1 | 1/2009 | Canny |
| 2009/0076927 A1 | 3/2009 | Sridhar et al. |
| 2009/0303238 A1* | 12/2009 | Lam .................. G06F 17/30389 345/440 |
| 2009/0327267 A1 | 12/2009 | Wong |
| 2010/0131338 A1* | 5/2010 | Tan .................... G06Q 30/0253 705/14.51 |
| 2011/0029517 A1* | 2/2011 | Ji ....................... G06F 17/30864 707/734 |
| 2012/0036123 A1* | 2/2012 | Hasan ............... G06F 17/30386 707/723 |
| 2012/0066243 A1* | 3/2012 | Jammalamadaka ........................ G06F 17/30864 707/759 |
| 2012/0109966 A1 | 5/2012 | Liang |
| 2012/0123863 A1 | 5/2012 | Kaul |
| 2012/0124073 A1 | 5/2012 | Gross |
| 2012/0173562 A1 | 7/2012 | Zhu |
| 2012/0185359 A1* | 7/2012 | Chen ................. G06F 17/30424 705/26.63 |
| 2012/0233173 A1 | 9/2012 | Yang |
| 2013/0159314 A1 | 6/2013 | Kao |
| 2013/0232148 A1 | 9/2013 | MacDonald |
| 2013/0246456 A1 | 9/2013 | Sun et al. |
| 2013/0318101 A1 | 11/2013 | Chen et al. |
| 2014/0122523 A1 | 5/2014 | Aggarwal |
| 2014/0297476 A1* | 10/2014 | Wang ................ G06Q 30/0625 705/26.62 |
| 2014/0324851 A1* | 10/2014 | Tholiya ............. G06F 17/30864 707/731 |
| 2015/0088642 A1* | 3/2015 | Mathew ............ G06Q 30/0633 705/14.51 |
| 2016/0085813 A1 | 3/2016 | Setty et al. |
| 2016/0203540 A1 | 7/2016 | Shi et al. |

\* cited by examiner

Score calculation:

$$type_{cat} = \begin{cases} 1 \text{ if } score_{cat} \geq 0.09 \\ 2 \text{ if } score_{cat} \geq 0.06 \\ 3 \text{ if } score_{cat} \geq 0.009 \\ 4 \text{ otherwise} \end{cases} \quad \text{---401}$$

where $$score_{cat} = ctr_c - 2 * \sqrt{ctr_c * (1 - ctr_c)} \quad \text{---402}$$

$$ctr_c = \frac{\sum_{i=highest\_ctr\_product}^{10} ctr_i}{\min(10, totalProductInCategory)} \quad \text{---403}$$

$$ctr_p = \frac{clicks_p}{pageviews_p} \text{ if } pageviews_c \neq 0 \text{ else } 0 \quad \text{---404}$$

$$pageviews_p = \sum_{i=beginning_{date}}^{today_{date}} pageviews_i \quad \text{---406}$$

$$clicks_p = \sum_{i=beginning_{date}}^{today_{date}} clicks_i \quad \text{---407}$$

$pageviews_i$ = number of times product shown to users for a query on date i ⎞ 408

$clicks_i$ = number of times product clicked by users for the query on date i ⎠ 409

Figure 4

Score calculation:

$$score_{cat} = \frac{score_c}{max_c} \quad \text{---} 701$$

$$type_{cat} = \begin{cases} 1 \text{ if } score_{cat} \geq 0.45 \\ 2 \text{ if } score_{cat} \geq 0.10 \\ 3 \text{ if } score_{cat} \geq 0.05 \\ 4 \text{ otherwise} \end{cases} \quad \text{---} 702$$

where $$score_c = \frac{clicks_c + 2}{pageviews_c + 4} - 3 * \sqrt{\frac{clicks_c + 2}{pageviews_c + 4} * \left(1 - \frac{clicks_c + 2}{pageviews_c + 4}\right)} \quad \text{---} 703$$

$$pageviews_c = \sum_{i=beginning_{date}}^{today_{date}} pageviews_i * 0.995^{date_{today_{date}} - date_i} \quad \text{---} 704$$

$$clicks_c = \sum_{i=beginning_{date}}^{today_{date}} clicks_i * 0.995^{date_{today_{date}} - date_i} \quad \text{---} 705$$

$$pageviews_i = \text{number of times category shown to users for a query on date } i \quad \text{\Large \}} 706$$

$$clicks_i = \text{number of times category clicked by users for the query on date } i \quad \text{\Large \}} 707$$

$$max_c = \max_{1 \leq i \leq n}(score_i, 0.12) \quad \text{---} 708$$

*Figure 7*

SEARCH RELEVANCE

RELATED PATENT APPLICATIONS

This patent application claims priority to, and is a continuation of, U.S. non-provisional patent application Ser. No. 14/194,330, filed Feb. 28, 2014, Search Relevance, which is a continuation-in-part of U.S. non-provisional patent application Ser. No. 14/186,717 filed Feb. 21, 2014, Classifying Queries to Generate Category Mappings, which is a continuation-in-part of U.S. non-provisional patent application Ser. No. 13/874,023, filed Apr. 30, 2013, Classifying E-Commerce Queries to Generate Category Mappings for Dominant Products, all of which have at least one of the same inventors in common with the current patent application and the same assignee, and the contents of all of which are incorporated herein by reference.

FIELD OF THE INVENTION

The present invention relates generally to handling search queries, and, more particularly, to improving search relevance of a query using a query classification model.

BACKGROUND OF THE INVENTION

Since the advent of the Internet, many retail stores offer the option to purchase items "online" through a retail store website. With the presence of an Internet connection, consumers can direct a web browser to a retail store website by entering a Uniform Resource Locator (URL) in the address bar of the web browser. The displayed retail store website allows consumers to see the items that are available from that store, almost as if the consumer was physically in the store looking at the products that are available on the shelves. The store website may organize the items that are available from the store into different sections, categories, or departments to help facilitate the consumer navigating through the store website. Furthermore, the store website may advertise any specials that are currently occurring in an effort to entice the consumer to purchase items that are on sale.

As the consumer navigates through the website and selects a particular product, the website may display additional details about the product. For example, the website may display the retail price of the item and any discounts or sale prices that may be available. Information may be displayed about the product specifications, user reviews of the product, and an option to compare selected products to each other.

Finally, if the consumer decides to purchase a particular item, the website provides an option to add the item to a purchase queue, commonly labeled as "cart." The cart simulates a shopping cart and allows the consumer to accumulate items from the website until they are ready to execute a transaction, pay for the products that have been added to their cart, and provide billing and shipping details.

A common difficulty for online consumers is navigating to the correct location to find the products that they are interested in researching or purchasing; especially if the product is unique or needs to be from a specific manufacturer. As more and more products become readily available for purchase, this task becomes increasingly difficult to filter out the product of interest from the innumerable other products that are available for purchase.

In order to help facilitate the online shopping experience for a customer, retail stores provide search features on their websites. The search feature allows a consumer to execute queries on product names and/or merchandise categories. Queries enable the consumer to find the products that they are interested in purchasing and/or researching in a more convenient and timely fashion. In response to a query on a particular search term, a website can return the products that most closely resemble the search terms entered by the consumer. The products are often returned in the form of a list.

Given the many products that are available for purchase over the Internet, it becomes incumbent for a retail store to optimize their search feature such that a consumer can find items of interest in a timely and efficient manner. If a retail store's search feature is not optimized, and returns results that are not of interest to the consumer, the consumer may decide to give up and not make the purchase they had intended, or to visit a different store's website. These actions can result in a loss of business to the retail store, and may serve as a deterrent, causing the consumer to not visit the website again in the future.

In order to improve the search feature's search results, many retail stores incorporate human input in addition to the search algorithms that are already present. The human input is used to modify a product's fields so that more relevant items are returned when a query is executed. However, human input requires significant effort, and is error prone.

BRIEF DESCRIPTION OF THE DRAWINGS

The specific features, aspects and advantages of the present invention will become better understood with regard to the following description and accompanying drawings where:

FIG. 4 illustrates example equations for assigning category types.

FIG. 7 illustrates example equations for assigning category types.

DETAILED DESCRIPTION

Figure 1:
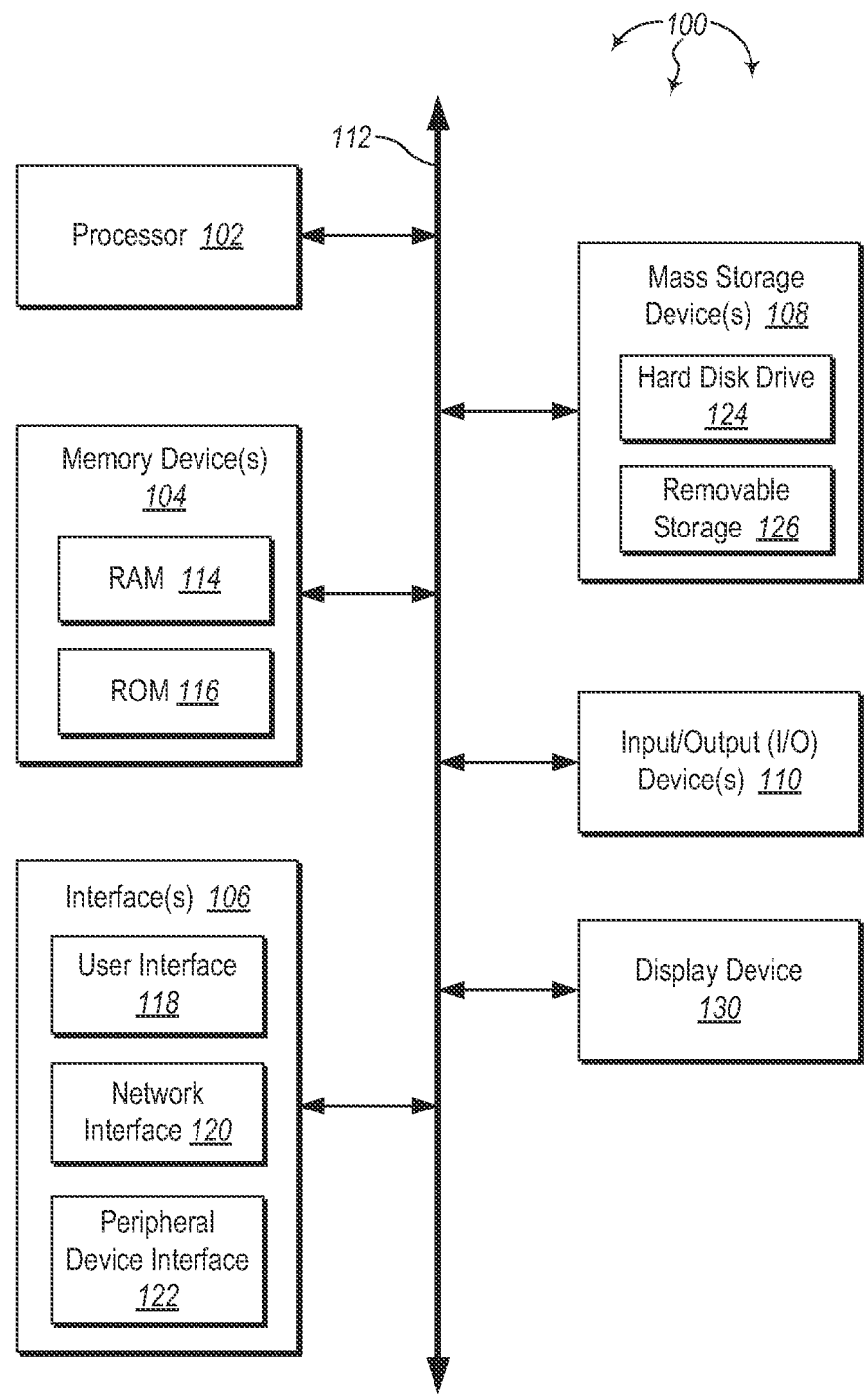
FIG. 1 illustrates an example block diagram of a computing device.

The present invention extends to methods, systems, and computer program products for improving search relevance. In a particular embodiment, a method identifies a first group of mappings generated for dominant queries associated with a query log containing a plurality of user queries. The method also identifies a second group of mappings that includes mappings between a first set of queries and categories shown for the first set of queries, and mappings between a second set of queries and clicked products for the second set of queries. For a received query, the method applies the second group of mappings for the received query if the category mappings for the received query are in the second group of mappings. Additionally, the method applies the first group of mappings for the received query if the category mappings for the received query are in the first group of mappings but not in the second group of mappings.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Hardwired connections can include, but are not limited to, wires with metallic conductors and/or optical fibers. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. RAM can also include solid state drives (SSDs or PCIx based real time memory tiered Storage, such as FusionIO). Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the invention can also be implemented in cloud computing environments. In this description and the following claims, "cloud computing" is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service (SaaS), Platform as a Service (PaaS), Infrastructure as a Service (IaaS), and deployment models (e.g., private cloud, community cloud, public cloud, hybrid cloud, etc.). Databases and servers described with respect to the present invention can be included in a cloud model.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the following description and Claims to refer to particular system components. As one skilled in the art will appreciate, components may be referred to by different names. This document does not intend to distinguish between components that differ in name, but not function.

FIG. 1 illustrates an example block diagram of a computing device 100. Computing device 100 can be used to perform various procedures, such as those discussed herein. Computing device 100 can function as a server, a client, or any other computing entity. Computing device 100 can perform various communication and data transfer functions as described herein and can execute one or more application programs, such as the application programs described herein. Computing device 100 can be any of a wide variety of computing devices, such as a mobile telephone or other mobile device, a desktop computer, a notebook computer, a server computer, a handheld computer, tablet computer and the like.

Computing device 100 includes one or more processor(s) 102, one or more memory device(s) 104, one or more interface(s) 106, one or more mass storage device(s) 108, one or more Input/Output (I/O) device(s) 110, and a display device 130 all of which are coupled to a bus 112. Processor(s) 102 include one or more processors or controllers that execute instructions stored in memory device(s) 104 and/or mass storage device(s) 108. Processor(s) 102 may also include various types of computer storage media, such as cache memory.

Memory device(s) 104 include various computer storage media, such as volatile memory (e.g., random access memory (RAM) 114) and/or nonvolatile memory (e.g., read-only memory (ROM) 116). Memory device(s) 104 may also include rewritable ROM, such as Flash memory.

Mass storage device(s) 108 include various computer storage media, such as magnetic tapes, magnetic disks, optical disks, solid state memory (e.g., Flash memory), and so forth. As depicted in FIG. 1, a particular mass storage device is a hard disk drive 124. Various drives may also be included in mass storage device(s) 108 to enable reading from and/or writing to the various computer readable media. Mass storage device(s) 108 include removable media 126 and/or non-removable media.

I/O device(s) 110 include various devices that allow data and/or other information to be input to or retrieved from computing device 100. Example I/O device(s) 110 include cursor control devices, keyboards, keypads, barcode scanners, microphones, monitors or other display devices, speakers, printers, network interface cards, modems, cameras, lenses, CCDs or other image capture devices, and the like.

Display device 130 includes any type of device capable of displaying information to one or more users of computing device 100. Examples of display device 130 include a monitor, display terminal, video projection device, and the like.

Interface(s) 106 include various interfaces that allow computing device 100 to interact with other systems, devices, or computing environments as well as humans. Example interface(s) 106 can include any number of different network interfaces 120, such as interfaces to personal area networks (PANs), local area networks (LANs), wide area networks (WANs), wireless networks (e.g., near field communication (NFC), Bluetooth, and Wi-Fi networks), and the Internet. Other interfaces include user interface 118 and peripheral device interface 122.

Bus 112 allows processor(s) 102, memory device(s) 104, interface(s) 106, mass storage device(s) 108, and I/O device(s) 110 to communicate with one another, as well as other devices or components coupled to bus 112. Bus 112 represents one or more of several types of bus structures, such as a system bus, PCI bus, IEEE 1394 bus, USB bus, and so forth.

Figure 2:
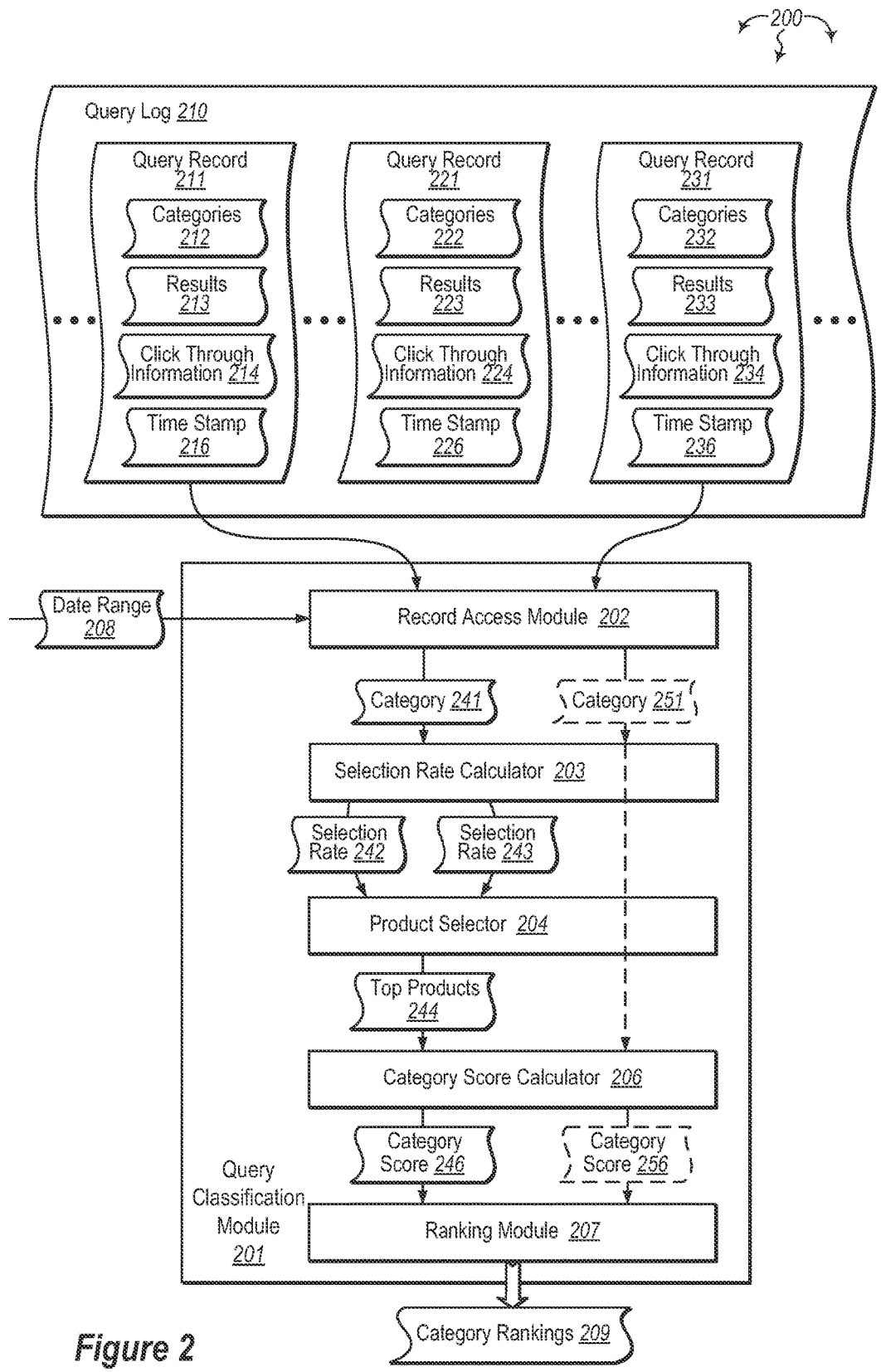
FIG. 2 illustrates an example computer architecture for classifying e-commerce queries to generate category mappings for dominant products.

FIG. 2 illustrates an example computer architecture 200 for classifying e-commerce queries to generate category mappings for dominant products. Referring to FIG. 2, computer architecture 200 includes query classification module 201 and query log 210. Each of query classification module 201 and query log 210 as well as their respective components can be connected to one another over (or be part of) a network, such as, for example, a PAN, a LAN, a WAN, and even the Internet. Accordingly, query classification module 201 and query log 210 as well as any other connected computer systems and their components, can create message related data and exchange message related data (e.g., near field communication (NFC) payloads, Bluetooth packets, Internet Protocol (IP) datagrams and other higher layer protocols that utilize IP datagrams, such as, Transmission Control Protocol (TCP), Hypertext Transfer Protocol (HTTP), Simple Mail Transfer Protocol (SMTP), etc.) over the network.

Generally, query log 210 can include a plurality of query records. The query records can be accumulated within query log 210 in response to customers entering queries against a product database, such as, for example, on an e-commerce website. As depicted, query log 210 includes a plurality of query records including query records 211, 221, and 231. Each query record can include data corresponding to a customer entered query. Query records can include one or more categories used as search terms, results returned in response to the one or more categories (e.g., any products that matched the search terms), click through information (e.g., product impression that were selected by a user), and a time stamp.

For example, query record 211 includes categories 212, results 213, click through information 214, and time stamp 216. Similarly, query record 221 includes categories 222, results 223, click through information 224, and time stamp 226. Likewise, query record 231 includes categories 232, results 233, click through information 234, and time stamp 236.

Query records can also include other information, such as, for example, all of the products shown to the user, whether or not the product was added to the cart, whether or not the product was ordered, the order number, the product's primary and other category mappings, and the product position in the search results.

As depicted, query classification module 201 includes record access module 202, selection rate calculator 203, product selector 204, category score calculator 206, and ranking module 207. Record access module 202 is configured to mine query log 210 for query records with click through information that indicates one or more products were selected from among corresponding query results. As such, record access module 202 can form a set of one or more categories from which a product was selected. Record access module can be configured to mine query log 210 for query records within a specified time frame (e.g., within the last six months).

Selection rate calculator 203 is configured to calculate a selection rate for any product returned in a query result for a specified category. Product selector 204 is configured to identify a specified top number (e.g., top ten) of products in the specified category. The specified top number of products can have higher selection rates relative to other products in the specified category. Category score calculator 206 is configured to calculate a category score based on product information associated with the specified top number of products in the specified category.

In some embodiments, the functionality of selection rate calculator 203, product selector 204, and category score calculator 206 are implemented on each category in set of one or more categories formed by record access module 202. For each category, selection rate calculator 203 can calculate a selection rate for any product contained in request results for the category. For each category, product selector 204 can identify a specified top number of products. For each category, category score calculator 206 can calculate category score for the category based on product information associated with the specified top number of products in the category.

Ranking module 207 is configured to rank one or more categories relative to one another based on calculated category scores. In some embodiments, categories are assigned to different category types based on calculated category scores.

Figure 3:
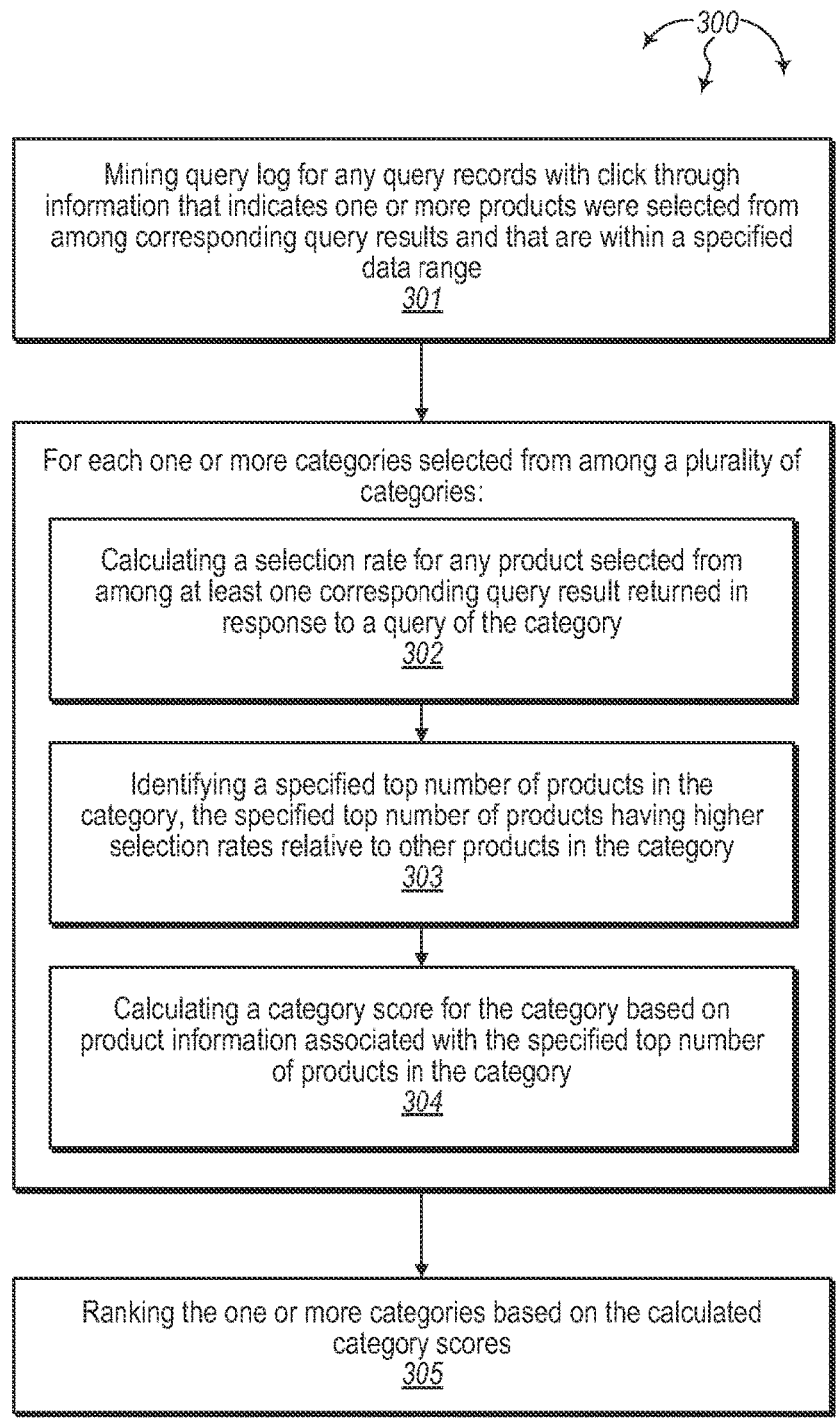
FIG. 3 illustrates a flow chart of an example method for classifying e-commerce queries to generate category mappings for dominant products.

FIG. 3 illustrates a flow chart of an example method 300 for classifying e-commerce queries to generate category mappings for dominant products. Method 300 will be described with respect to the components of computer architecture 200.

Method 300 includes mining the query log for any query records with click through information that indicates one or more products were selected from among corresponding query results and that are within a specified date range (act 301). Record access module 202 can mine query log 210 for query records with click through information that indicates one or more products were selected from among corresponding query results and that are within date range 208. For example, record access module 202 can determine that click through information 214 indicates that one or more products were selected from among results 213 and that time stamp 216 is within date range 208. Likewise, record access module 202 can determine that click through information 234 indicates that one or more products were selected from among results 233 and that time stamp 236 is within date range 208. Similar determinations can be made for other query records in query log 210.

Each of categories 212 and 232 can include one or more categories (e.g., electronics, sports, tablets, etc.) that were used as search terms in a user query of a product database.

For each of one or more categories selected from among a plurality of categories, method 300 includes, calculating a selection rate for any product selected from among at least one corresponding query result returned in response to a query of the category (302). For each category in categories 212 and 232, selection rate calculation module 203 can calculate a selection rate for any product selected from among at least one query result returned in response to a query for the category. For example, selection rate calculator 203 can calculate selection rate 242 for a product selected from among at least one query result returned in response to a query for category 241 (which can be a category in categories 212 or 232). Selection rate calculator 203 can also calculate selection rate 243 for another different product selected from among at least one query result returned in response to a query for category 241. Selection rate calculator 203 can also calculate selection rates for further other products selected from among at least one query result returned in response to a query for category 241.

Similarly, selection rate calculator 203 can calculate selection rates for one or more products selected from among at least one query result returned in response to a query for category 251 (which can also be a category in categories 212 or 232). Selection rates can also be calculated for one or more products selected from among at least one query result returned in response to a for other categories in categories 212 and 232.

Calculating a selection rate for a product can include calculating a click-through rate based on the number of times a product was shown to users (i.e., the number of impressions) and the number of times the product was clicked on by users. Other information can also be considered when calculating selection rate for a product, including but not limited to: add to (electronic shopping) cart ratio, order ratio, and product position signals.

In some embodiments, prior to calculating selection rate, one or more products are qualified from among a plurality of products. The plurality of products is selected from among at least one corresponding query result returned in response to a query of the category. The one or more products are qualified by having one or more of: a minimum number of clicks (e.g., 2) and a minimum number of impressions (e.g., 10). In these embodiments, selection rates may not be calculated for non-qualified products.

For each of one or more categories selected from among the plurality of categories, method 300 includes identifying a specified top number of products in the category, the specified top number of products having higher selection rates relative to other products in the category (303). For example, product selector 204 can identify top products 244 (e.g., the top ten products) in category 241. Top products 242 can have higher selection rates relative to other products in category 241. Similarly, product selector 204 can identify the top products (e.g., the top ten products) in category 251. The top products in category 251 can have higher selection rates relative to other products in category 251. Product selector 204 can also identify the top products for other categories in categories 212 and 232. These other top products can have higher selection rates relative to other products in their respective categories.

For each of one or more categories selected from among the plurality of categories, calculating a category score for the category based on product information associated with the specified top number of products in the category (304). For example, category score calculator 206 can calculate category score 246 based on product information associated with top products 244. Similarly, category score calculator 206 can calculate category score 256 based on product information for the top products in category 251. Category score calculator 206 can also calculate category scores for other categories in categories 212 and 232 based on product information for the top products in those categories respectively.

In some embodiments, a confidence interval can be used to remove bias from category score calculations. The formula used for confidence interval treatment can be varied.

It may be that the relative age of query records is considered when calculating category scores. Newer query records can be weighted to impact query score calculations more significantly. On the other hand, older query records can be weight to impact query score calculations less significantly. In other embodiments, query records are equally weighted.

In some embodiments, prior to calculating category scores, one or more categories are qualified from among a plurality of categories. A category can be qualified as a candidate when the category has a specified number of impressions (e.g., 100) or a specified period of time (e.g., six months). In these embodiments, category scores may not be calculated for non-qualified categories.

Method 300 includes ranking the one or more categories based on the calculated category scores (305). For example, ranking module 207 can rank category 241, category 251, and other categories in categories 212 and 232 based on category score 246, category score 256, and category scores for other categories in categories 212 and 232. Category rankings can be represented in category rankings 209.

In some embodiments, query classification module 201 can consider the contents of (possibly many) additional query records in query log 210 when ranking categories. As described, query records can also include other information, such as, for example, all of the products shown to the user, whether or not the product was added to the cart, whether or not the product was ordered, the order number, the product's primary and other category mappings, and the product position in the search results. This other information can be considered when classifying e-commerce queries.

Products can be assigned to a plurality of categories. In some embodiments, a product is assigned to a primary category. The primary category can then be used for classifying queries. In other embodiments, each of a plurality of categories can be used for classifying e-commerce queries.

Categories can also be assigned types based on category scores. FIG. 4 illustrates example equations for assigning category types. As depicted in FIG. 4, a category can be assigned a type (e.g., 1, 2, 3, or 4) based on a calculated category score for the category. Equation 402 is an example of an equation for calculating a category score. As depicted in equation 402, a category score for a category can be calculated from a click-through rate for products in the category.

Equation 403 is an example of an equation for calculating a click-through rate for a category. As depicted in equation 403, a click-through rate for a category is based on click-through rates for products in the category. Equation 404 is an example of an equation for calculating the click-through rate for a product. As depicted in equation 404, a click-through rate for a product is based on product clicks and product page views within a date range. Equation 406 is an example of an equation for calculating page views within a date range. Equation 407 is an example of an equation for calculating clicks within a date range. Equation 408 defines product page views and equation 409 defines product clicks.

Figure 5:
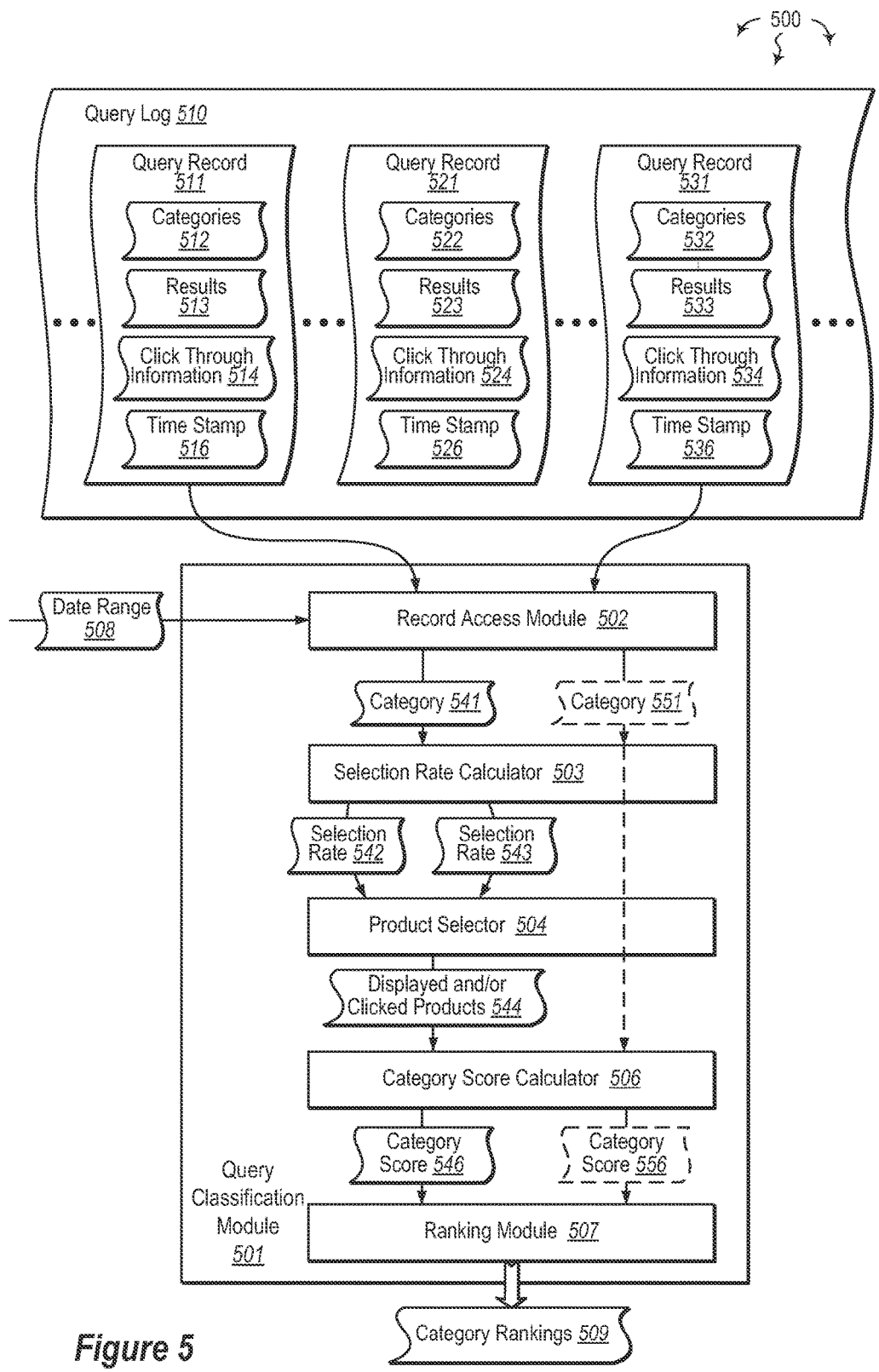
FIG. 5 illustrates an example computer architecture for classifying e-commerce queries to generate category mappings for queries with sufficient clicks.

FIG. 5 illustrates an example computer architecture 500 for classifying e-commerce queries to generate category mappings for queries with sufficient clicks. Referring to FIG. 5, computer architecture 500 includes query classification module 501 and query log 510. Each of query classification module 501 and query log 510 as well as their respective components can be connected to one another over (or be part of) a network, such as, for example, a PAN, a LAN, a WAN, and even the Internet. Accordingly, query classification module 501 and query log 510 as well as any other connected computer systems and their components, can create message related data and exchange message related data (e.g., near field communication (NFC) payloads, Bluetooth packets, Internet Protocol (IP) datagrams and other higher layer protocols that utilize IP datagrams, such as, Transmission Control Protocol (TCP), Hypertext Transfer Protocol (HTTP), Simple Mail Transfer Protocol (SMTP), etc.) over the network.

Generally, query log 510 can include a plurality of query records. The query records can be accumulated within query log 510 in response to customers entering queries against a product database, such as, for example, on an e-commerce website. As depicted, query log 510 includes a plurality of query records including query records 511, 521, and 531. Each query record can include data corresponding to a customer entered query. Query records can include one or more categories used as search terms, results returned in response to the one or more categories (e.g., any products that matched the search terms), click through information (e.g., product impression that were selected by a user), and a time stamp.

For example, query record 511 includes categories 512, results 513, click through information 514, and time stamp 516. Similarly, query record 521 includes categories 522, results 523, click through information 524, and time stamp 526. Likewise, query record 531 includes categories 532, results 533, click through information 534, and time stamp 536.

Query records can also include other information, such as, for example, all of the products shown to the user, whether or not the product was added to the cart, whether or not the user clicked on (or otherwise selected) the product, whether or not the product was ordered, the order number, the product's primary and other category mappings, and the product position in the search results.

As depicted, query classification module 501 includes record access module 502, selection rate calculator 503, product selector 504, category score calculator 506, and ranking module 507. Record access module 502 is configured to mine query log 510 for query records with click through information that indicates one or more products were selected from among corresponding query results. As such, record access module 502 can form a set of one or more categories from which a product was selected. Record access module can be configured to mine query log 510 for query records within a specified time frame (e.g., within the last six months).

Selection rate calculator 503 is configured to calculate a selection rate for any product returned in a query result for a specified category. Product selector 504 is configured to identify a specified top number (e.g., top ten) of products in the specified category. The specified top number of products can have higher selection rates relative to other products in the specified category. Product selector 504 is also configured to identify products displayed but not clicked (or otherwise selected) by the user. Category score calculator 506 is configured to calculate a category score based on the number of times a category is shown and the number of times a category is clicked.

In some embodiments, the functionality of selection rate calculator 503, product selector 504, and category score calculator 506 are implemented on each category in a set of one or more categories formed by record access module 502. For each category, selection rate calculator 503 can calculate a selection rate for any product contained in request results for the category. For each category, product selector 504 can identify a specified top number of products. For each category, category score calculator 506 can calculate category score for the category based on product information associated with the specified top number of products in the category.

Ranking module 507 is configured to rank one or more categories relative to one another based on calculated category scores. In some embodiments, categories are assigned to different category types based on calculated category scores.

Figure 6:
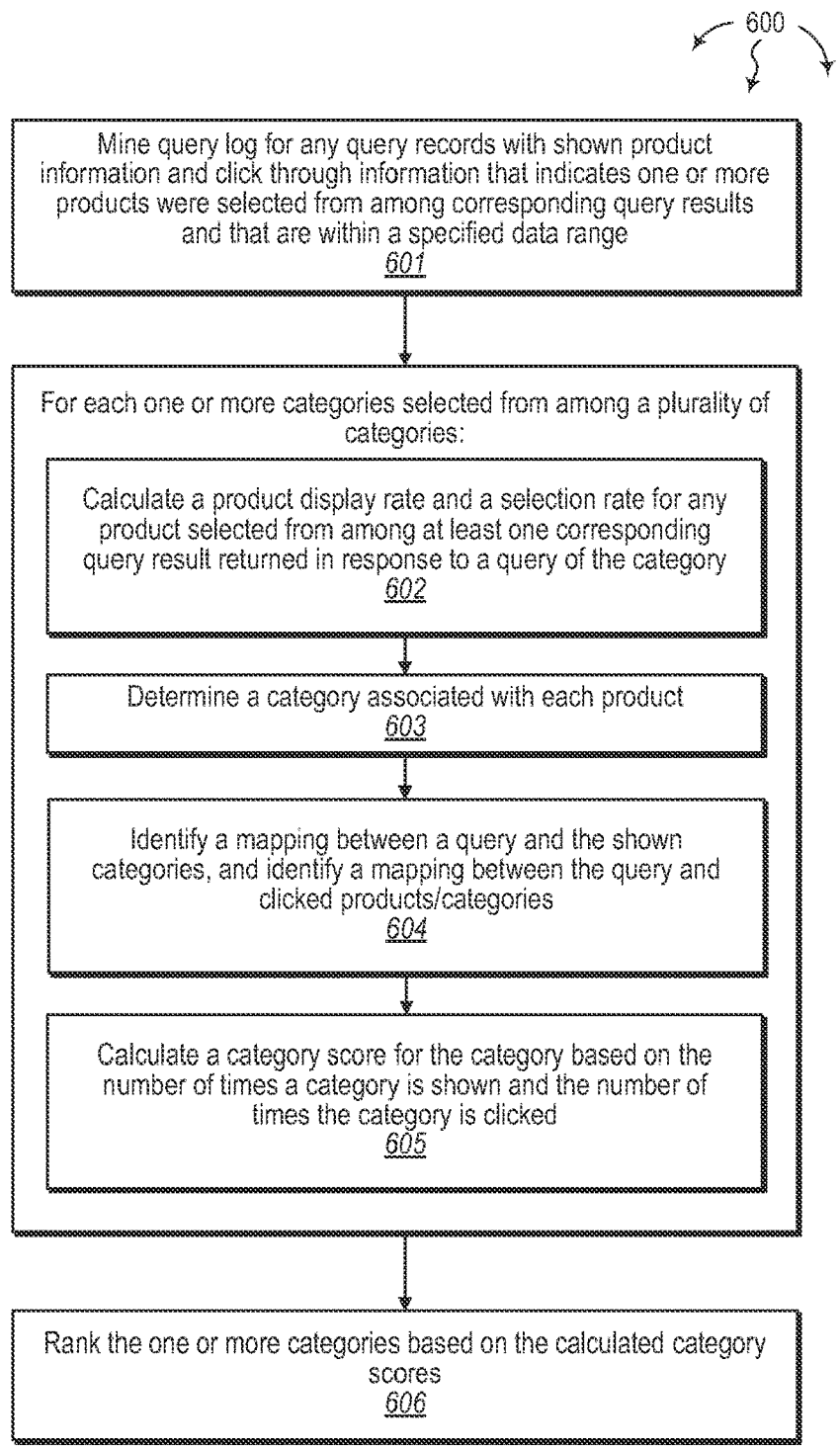
FIG. 6 illustrates a flow chart of an example method for classifying e-commerce queries to generate category mappings for queries with sufficient clicks.

FIG. 6 illustrates a flow chart of an example method 600 for classifying e-commerce queries to generate category mappings for queries with sufficient clicks. Method 600 will be described with respect to the components of computer architecture 500.

Method 600 includes mining the query log for any query records with shown product information and click through information that indicates one or more products were selected from among corresponding query results and that are within a specified date range (act 601). Record access module 502 can mine query log 510 for query records with displayed product information and click through information that indicates one or more products were displayed and/or selected from among corresponding query results and that are within date range 508. For example, record access module 502 can determine that click through information 514 indicates that one or more products were selected from among results 513 and that time stamp 516 is within date range 508. Likewise, record access module 502 can determine that click through information 534 indicates that one or more products were selected from among results 533 and that time stamp 536 is within date range 508. Similar determinations can be made for other query records in query log 510.

Each of categories 512, 522, and 532 can include one or more categories (e.g., electronics, sports, tablets, etc.) that were used as search terms in a user query of a product database.

For each of one or more categories selected from among a plurality of categories, method 600 includes, calculating a product display rate and a selection rate for any product selected from among at least one corresponding query result returned in response to a query of the category (602). For each category in categories 512, 522, and 532, selection rate calculation module 503 can calculate a selection rate (and/or a product display rate) for any product selected from among at least one query result returned in response to a query for the category. For example, selection rate calculator 503 can calculate selection rate 542 for a product selected from among at least one query result returned in response to a query for category 541 (which can be a category in categories 512, 522, or 532). Selection rate calculator 503 can also calculate selection rate 543 for another different product selected from among at least one query result returned in response to a query for category 541. Selection rate calculator 503 can also calculate selection rates for further other products selected from among at least one query result returned in response to a query for category 541. Additionally, selection rate calculator 503 can calculate a product display rate for products and/or categories.

Similarly, selection rate calculator 503 can calculate selection rates for one or more products selected from among at least one query result returned in response to a query for category 551 (which can also be a category in categories 512, 522, or 532). Selection rates can also be calculated for one or more products selected from among at least one query result returned in response to other categories in categories 512, 522, and 532.

Calculating a selection rate for a product can include calculating a click-through rate based on the number of times a product was shown to users (i.e., the number of impressions) and the number of times the product was clicked on by users. Calculating the product display rate can include calculating the number of times a product was shown to the users, regardless of whether the user clicked (or otherwise selected) the displayed product. Other information can also be considered when calculating selection rate for a product, including but not limited to: add to (electronic shopping) cart ratio, order ratio, and product position signals.

In some embodiments, prior to calculating the selection rate, one or more products are qualified from among multiple products. The multiple products are selected from among at least one corresponding query result returned in response to a query of the category. The one or more products are qualified by having one or more of: a minimum number of clicks (e.g., 2) and a minimum number of impressions (e.g., 10). In these embodiments, selection rates may not be calculated for non-qualified products.

Method 600 also determines a category associated with each product (603). For each of one or more categories selected from among the plurality of categories, method 600 includes identifying a mapping between a query and the shown categories, and identifying a mapping between the query and the clicked products/categories (604). For example, product selector 504 can identify displayed and/or clicked products 544. Top products 542 can have higher click rates relative to other products in category 541. Similarly, product selector 504 can identify the top displayed products (e.g., products most frequently displayed to users) in category 551. Product selector 504 can also identify the most displayed and/or most clicked products for other categories in categories 512, 522, and 532. These other top products can have higher selection rates relative to other products in their respective categories.

For each of one or more categories selected from among the multiple categories, method 600 calculates a category score for the category based on the number of times a category is shown to a user and the number of times the category (or a product associated with the category) is clicked (605). For example, category score calculator 506 can calculate category score 546 based on product information associated with displayed and/or clicked products 544. Similarly, category score calculator 506 can calculate category score 556 based on product information associated with displayed and/or clicked products in category 551. Category score calculator 506 can also calculate category scores for other categories in categories 512, 522, and 532 based on product information for identified products in those categories respectively.

In some embodiments, a confidence interval can be used to remove bias from category score calculations. The formula used for confidence interval treatment can be varied.

In some embodiments, the relative age of query records is considered when calculating category scores. Newer query records can be weighted to impact query score calculations more significantly. On the other hand, older query records can be weight to impact query score calculations less significantly. In other embodiments, all query records are equally weighted.

In some embodiments, prior to calculating category scores, one or more categories are qualified from among a plurality of categories. A category can be qualified as a candidate when the category has a specified number of impressions (e.g., 100) or a specified period of time (e.g., six months). In these embodiments, category scores may not be calculated for non-qualified categories.

Method 600 includes ranking the one or more categories based on the calculated category scores (606). For example, ranking module 507 can rank category 541, category 551, and other categories in categories 512, 522, and 532 based on category score 546, category score 556, and category scores for other categories in categories 512, 522, and 532. Category rankings can be represented in category rankings 509.

In some embodiments, query classification module 501 can consider the contents of (possibly many) additional query records in query log 510 when ranking categories. As described, query records can also include other information, such as, for example, all of the products shown to the user, whether or not the user clicked (or otherwise selected) the product, whether or not the product was added to the cart, whether or not the product was ordered, the order number, the product's primary and other category mappings, and the product position in the search results. This other information can be considered when classifying e-commerce queries.

Products can be assigned to multiple categories. In some embodiments, a product is assigned to a primary category. The primary category can then be used for classifying queries. In other embodiments, multiple categories can be used for classifying e-commerce queries.

Categories can also be assigned types based on category scores. FIG. 7 illustrates example equations for assigning category types. Equation 701 is an example of an equation for calculating a category score. As depicted in FIG. 7 (at 702), a category can be assigned a type (e.g., 1, 2, 3, or 4) based on a calculated category score for the category.

Equation 703 is an example of an equation for calculating a score for a particular category. In the first term of equation 703, "4" is added to the denominator to avoid a divide-by-zero situation. Additionally, "2" is added to the numerator to avoid a zero result in the first term of equation 703. The second term of equation 703 represents a confidence interval and is subtracted from the first term to remove any bias in the score. As depicted in equation 703, a score for a category is based on the number of clicks and page views in the category.

Equation 704 is an example of an equation for calculating page views for a category. As depicted in equation 704, page views are considered within a date range such that the weight assigned to a particular page view decays as the date moves further into the past. For example, recent page views are given more weight in equation 704 than older page views.

Equation 705 is an example of an equation for calculating clicks for a category. As depicted in equation 705, clicks are considered within a date range such that the weight assigned to a particular click decays as the date moves further into the past. For example, recent clicks are given more weight in equation 705 than older clicks. Equation 706 defines category views and equation 707 defines category clicks. Equation 708 is an example of an equation for calculating a maximum value for scores in a particular category. The results of equation 708 are used in equation 701, discussed above.

Figure 8:
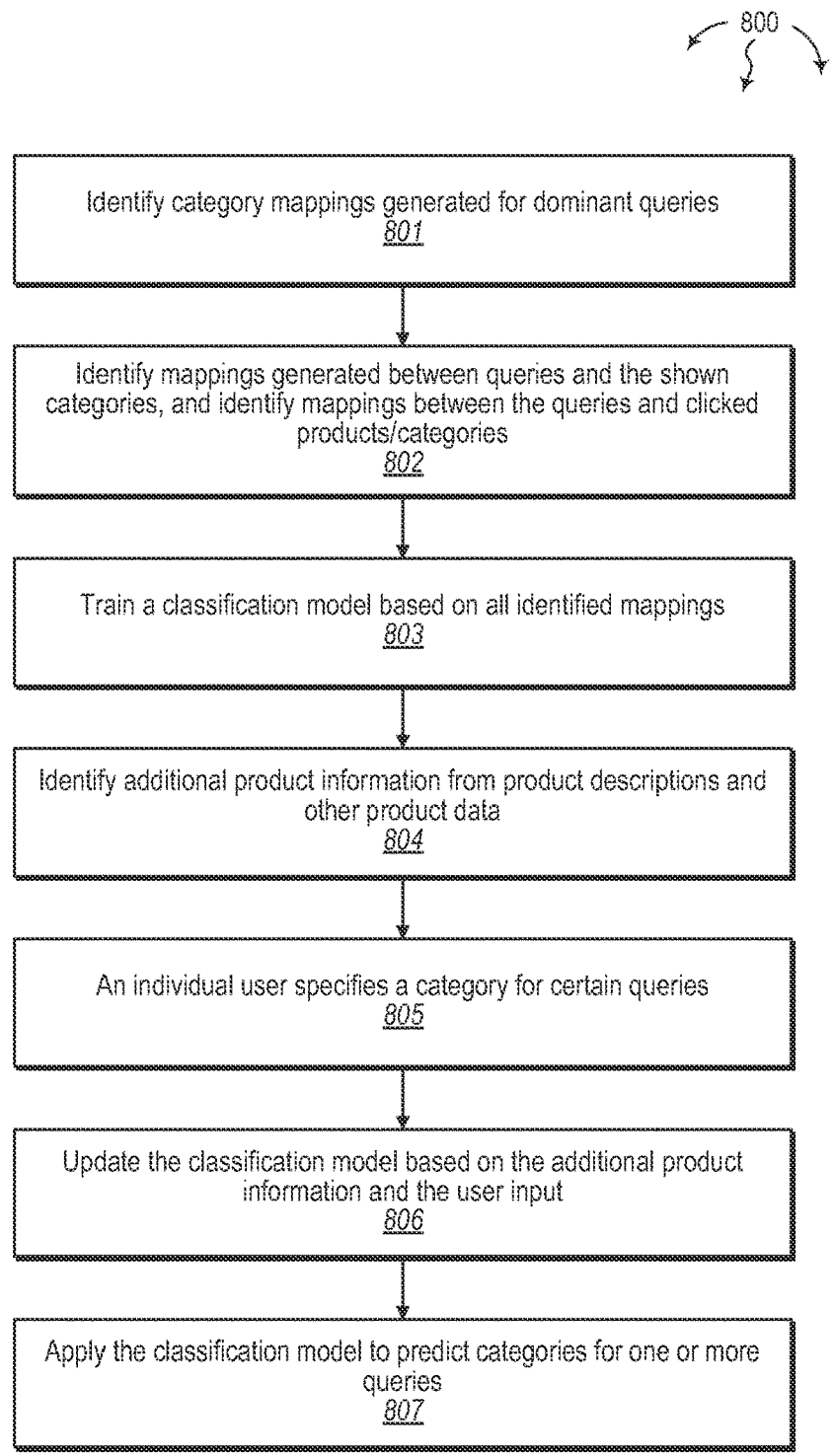
FIG. 8 illustrates a flow chart of an example method for training a classification model to predict categories for queries.

FIG. 8 illustrates a flow chart of an example method 800 for training a classification model to predict categories for queries. Initially, method 800 identifies category mappings generated for dominant queries (801). Examples of these category mappings for dominant queries are discussed herein, such as the systems and methods discussed with respect to FIGS. 2-4. Method 800 also identifies mappings generated between queries and the shown categories, and identifies mappings between the queries and clicked products/categories (802). Examples of these identified mappings are discussed herein, such as the systems and methods discussed with respect to FIGS. 5-7. At 803, a classification model is then trained based on all of the identified mappings (i.e., the mappings identified at 801 and 802).

In some embodiments, a classification model is trained using training data in the form of a "bag of words" that contains n-grams (e.g., unigrams, bigrams, etc.) associated with queries from a query log. The bag of words may also contain words obtained from product information, data entered by users, and any other data source. A "bag of words" refers to a representation of words (e.g., queries) as a bag (or multiset) without any specific relationship or ordering of the words. An n-gram is a sequence of n items (e.g., words associated with queries). In some embodiments, a unigram represents a one word query, a bigram represents a two word query, and so forth. The classification model is trained with a Naive Bayes Multinomial model, using the n-grams in the bag of words. This model predicts categories with a score for a particular query. Although the Naive Bayes Multinomial model is used in one embodiment, alternate embodiments may use any type of classification model.

Method 800 continues by identifying additional product information from product description and other product data (804). For example, product titles, product descriptions, product features, product characteristics, and other product information can be obtained from product catalogs, online data sources, product reviews, product web sites, and the like. This additional information is useful in classifying products into one or more product categories. The additional information is also useful in associating queries with a product and/or a product category. Method 800 also allows individual users to specify a category (and other information) for certain queries (805). The input from individual users is particularly useful in situations where a particular query has not previously been associated with a specific product and/or product category.

Method 800 continues by updating the classification model based on the additional product information and the user input (806). In particular embodiments, the classification model is updated periodically based on updated mappings, updated product information, updated user input, and the like. Thus, the classification model is continually changing to better predict categories for received queries. Finally, method 800 applies the classification model to predict categories for one or more queries (807).

Figure 9:
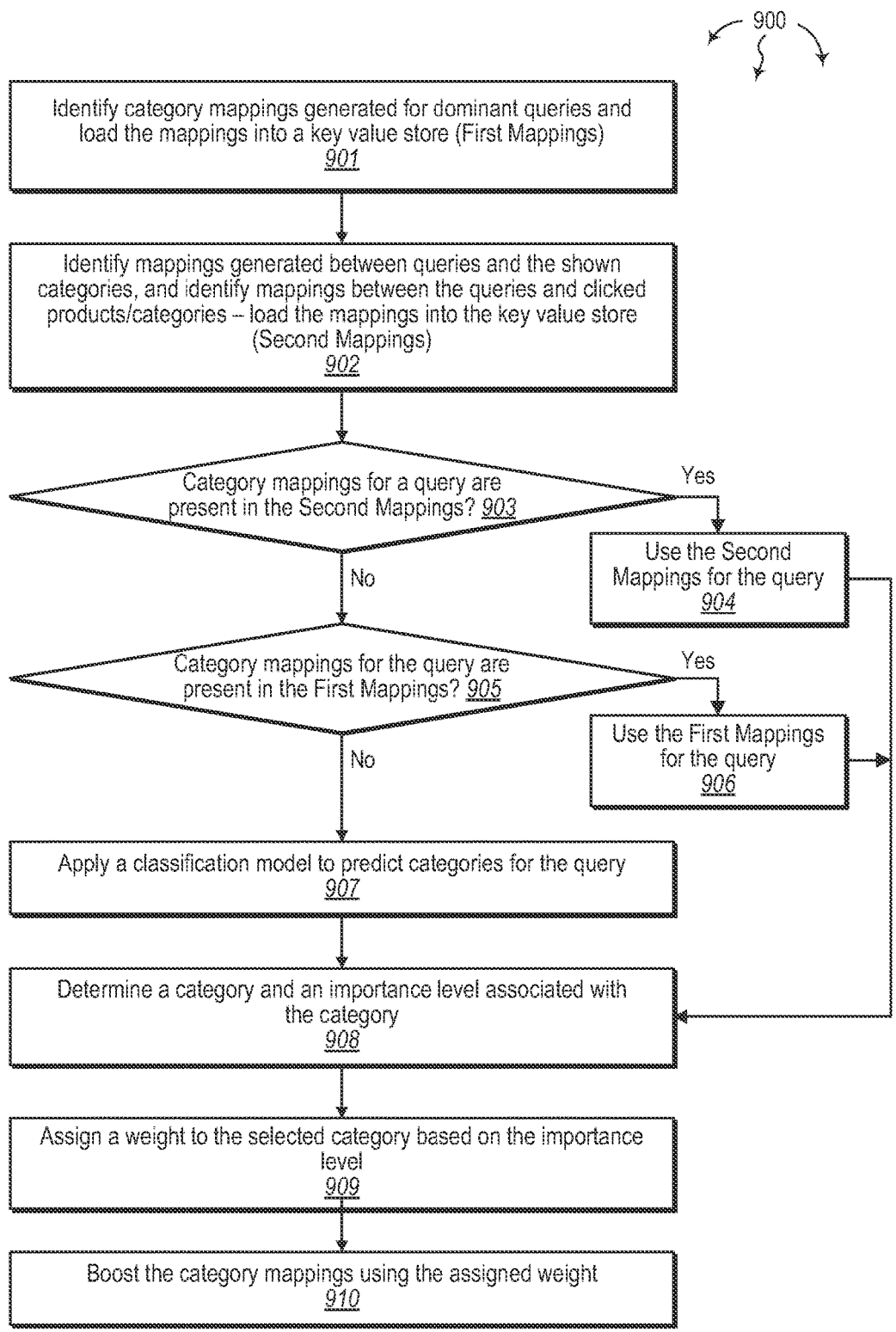
FIG. 9 illustrates a flow chart of an example method for improving search relevance of a query.

FIG. 9 illustrates a flow chart of an example method 900 for improving search relevance of a query. Initially, method 900 identifies category mappings generated for dominant queries and loads the mappings into a key value store (901). These identified category mappings are referred to as the "first mappings." Examples of the category mappings for dominant queries are discussed herein, such as the systems and methods discussed with respect to FIGS. 2-4. Method 900 also identifies mappings between queries and the shown categories, and identifies mappings between the queries and clicked products/categories (902). These identified mappings are referred to as "second mappings," which are also loaded into the key value store. Examples of these identified mappings are discussed herein, such as the systems and methods discussed with respect to FIGS. 5-7.

When evaluating a query, method 900 determines whether category mappings for the query are present in the second mappings (903). In this embodiment, the second mappings are considered to be the most reliable predictors of a category for the query. If category mappings for the query are present in the second mappings, the second mappings are used for the query (904). If category mappings for the query are not present in the second mappings, method 900 determines whether category mappings for the query are present in the first mappings (905). If category mappings for the query are present in the first mappings, the first mappings are used for the query (906). If category mappings for the query are not present in the first mappings, method 900 applies a classification model to predict categories for the query (907). An example classification model is discussed herein with respect to FIG. 8.

After determining whether to use the second mappings, the first mappings or the classification model for the query, method 900 determines a category and an importance level associated with the category (908). In some embodiments, the importance level has a value of 1, 2, 3 or 4. Each importance level has an associated weight. Method 900 assigns a weight to the selected category based on the importance level associated with the category (909). Alternatively, the weight value may be identified (or determined)

if it was previously assigned. For example, importance level 1 is weighted higher than importance level 2, importance level 2 is weighted higher than importance level 3, and importance level 3 is weighted higher than importance level 4. The weight is used in calculating a score, as discussed herein, for each product or category associated with a particular query. In some embodiments, a solr scoring function is used to calculate scores. Solr is an open source enterprise search platform. The importance levels and associated weights may be determined manually by a user or automatically by one or more systems or methods discussed herein. In one embodiment, the importance levels and associated weights are determined by query classification module 201 and/or 501.

Finally, the category mappings are boosted using the assigned weight (910). For example, if a particular category has a weight of 2, the boosted value of the query is squared (BoostedCategoryValue=CategoryValue.sup.2). This boosted value may result in presenting products in the boosted category higher in the search results since these products are likely to be more relevant to the query.

Although the components and modules illustrated herein are shown and described in a particular arrangement, the arrangement of components and modules may be altered to process data in a different manner. In other embodiments, one or more additional components or modules may be added to the described systems, and one or more components or modules may be removed from the described systems. Alternate embodiments may combine two or more of the described components or modules into a single component or module.

The foregoing description has been presented for the purposes of illustration and description. It is not intended to be exhaustive or to limit the invention to the precise form disclosed. Many modifications and variations are possible in light of the above teaching. Further, it should be noted that any or all of the aforementioned alternate embodiments may be used in any combination desired to form additional hybrid embodiments of the invention.

Further, although specific embodiments of the invention have been described and illustrated, the invention is not to be limited to the specific forms or arrangements of parts so described and illustrated. The scope of the invention is to be defined by the claims appended hereto, any future claims submitted here and in different applications, and their equivalents.

What is claimed is:

1. At a computer system, the computer system including one or more processors and system memory, the computer system communicatively coupled to a query log, the query log including query records for e-commerce queries executed against a product database, each query record of the query records comprising: one or more categories that were used as search terms, query results from submitting the search terms in a query of the product database, and click through information indicating products that were selected from among the query results, the product database using a plurality of categories to categorize products, the one or more categories selected from among the plurality of categories, a method for classifying e-commerce queries to generate category mappings, the method comprising:

identifying, in the query log, first query records of the query records that are within a specified date range with the click through information that indicates that one or more selected products were selected from corresponding query results;

identifying, in the query log, second query records of the query records that are within the specified date range with display information that indicates that one or more displayed products were displayed;

for each category of the one or more categories selected from among the plurality of categories:

calculating a selection rate of each of the one or more selected products selected among at least one corresponding query result returned in response to a query of the category, wherein the at least one corresponding query result is from the corresponding query results;

calculating a product display rate for the one or more selected products selected from among the at least one corresponding query result returned in response to the query of the category;

identifying a first mapping between the query of the category and the one or more displayed products based at least in part on the product display rate;

identifying a second mapping between the query of the category and the one or more selected products based at least in part on the selection rate; and calculating a category score of the category based on a first number of times the category was shown and a second number of times the category was clicked;

performing a ranking of the one or more categories based on the category score of the category for each of the one or more categories;

training a classification model using a Naïve Bayes Multinomial model based at least in part on the ranking of the one or more categories, the first mappings and the second mappings;

periodically updating the classification model based on updates to the first mappings and the second mappings; and applying the classification model to predict at least one product category of the one or more categories to respond to at least one query from at least one online consumer.

2. The method of claim 1 further comprising:
applying a confidence interval to products in the category to remove bias from the category scores.

3. The method of claim 2 further comprising:
varying a formula for the confidence interval.

4. The method of claim 1, wherein the specified date range is six months.

5. The method of claim 4 further comprising:
applying equal weighting to all of the query records, regardless of date, to calculate the category scores.

6. The method of claim 4 further comprising:
applying increased weighting to recent query records of the query records to calculate the category scores.

7. The method of claim 1, wherein performing the ranking of the one or more categories comprises:
assigning each of the one or more categories to a category type based on the category scores.

8. The method of claim 1, wherein calculating the selection rate for a product comprises:
calculating the selection rate based on categories of the plurality of categories to which the product is assigned.

9. The method of claim 8, wherein calculating the selection rate comprises:
considering an assigned primary category of the product.

10. The method of claim 1 further comprising:
parsing additional query record details from the query records, comprising identifying: products shown to a user, whether or not a product was added to an electronic cart, whether or not the product was ordered, an order number for the product, a primary mapping for the product, other category mappings for the product, and a position of the product in the query results.

11. The method of claim 10 further comprising:
modifying the click through information to consider the additional query record details including an add to cart ratio, an order ratio, and the position of the product in the query results.

12. The method of claim 1 further comprising, prior to calculating the selection rate for each of the one or more selected products:
qualifying the one or more selected products based on: a minimum number of clicks and a minimum number of impressions.

13. A computer system that classifies e-commerce queries, the computer system comprising:
one or more processors;
system memory; and
one or more computer storage media having stored thereon computer-executable instructions to:
mine a query log for query records within a specified date range that identify consumer products with shown product information and click through information;
determine a category associated with each of the consumer products;
for each category associated with each of the consumer products:
calculate a display rate and a selection rate for at least one product selected from among at least one corresponding query result returned in response to a query of the each category;
calculate a category score based on a first number of times the each category is shown and a second number of times the each category is clicked; and
rank the categories associated with the consumer products based on the category score for each of the categories to establish a ranking of the categories;
training a classification model using a Naïve Bayes Multinomial model based at least in part on the ranking of the categories and mappings based on at least one of the display rate or the selection rate;
periodically updating the classification model based on updates to the mappings; and
applying the classification model to predict at least one product category of the categories for a received product query.

14. The computer system of claim 13 further comprising: computer-executable instructions to apply a confidence interval to remove bias from the category score.

15. The computer system of claim 13, wherein the specified date range is six months.

16. The computer system of claim 13, further comprising computer-executable instructions to:
calculate and use to establish the ranking: an added to cart ratio, an order ratio, and product position signals.

17. A computer implemented method comprising:
identifying, using one or more processors, a first set of query records in a consumer product query log with click through information that indicates that a second set of one or more consumer products were selected from consumer product query results;
identifying, using the one or more processors, a third set of query records in the consumer product query log with display information that indicates that a fourth set of one or more consumer products were displayed;
determining a product category associated with each of a fifth set of one or more consumer products, wherein the fifth set of one or more consumer products includes the second set of one or more consumer products and the fourth set of one or more consumer products;
calculating a display rate and a selection rate for each of the second set of one or more consumer products;
calculating, using the one or more processors, a category score for the product category associated with each of the fifth set of one or more consumer products, wherein the category score is based on a number of times the product category was shown and a number of times the product category was clicked;
training a classification model using a Naïve Bayes Multinomial model based at least in part on a ranking, based on the category scores, of the product categories associated with the fifth set of one or more consumer products and mappings based on at least one of the display rate or the selection rate;
periodically updating the classification model based on updates to the mappings; and
applying the classification model to predict at least one product category of the product categories for a received product query.

18. The computer implemented method of claim 17 further comprising:
assigning a category type to the product categories associated with the fifth set of one or more consumer products.

19. The computer implemented method of claim 17 further comprising:
identifying first mappings between a sixth set of queries and shown categories;
identifying second mappings between a seventh set of queries and each of the second set of one or more consumer products,
wherein:
the mappings comprise the first mappings and the second mappings.

20. The computer implemented method of claim 17 further comprising:
limiting the first set of query records and the third set of query records to a specified date range.

* * * * *